March 27, 1956     L. S. LAPPIN     2,740,083
PROTECTIVE CIRCUIT
Filed Aug. 27, 1954
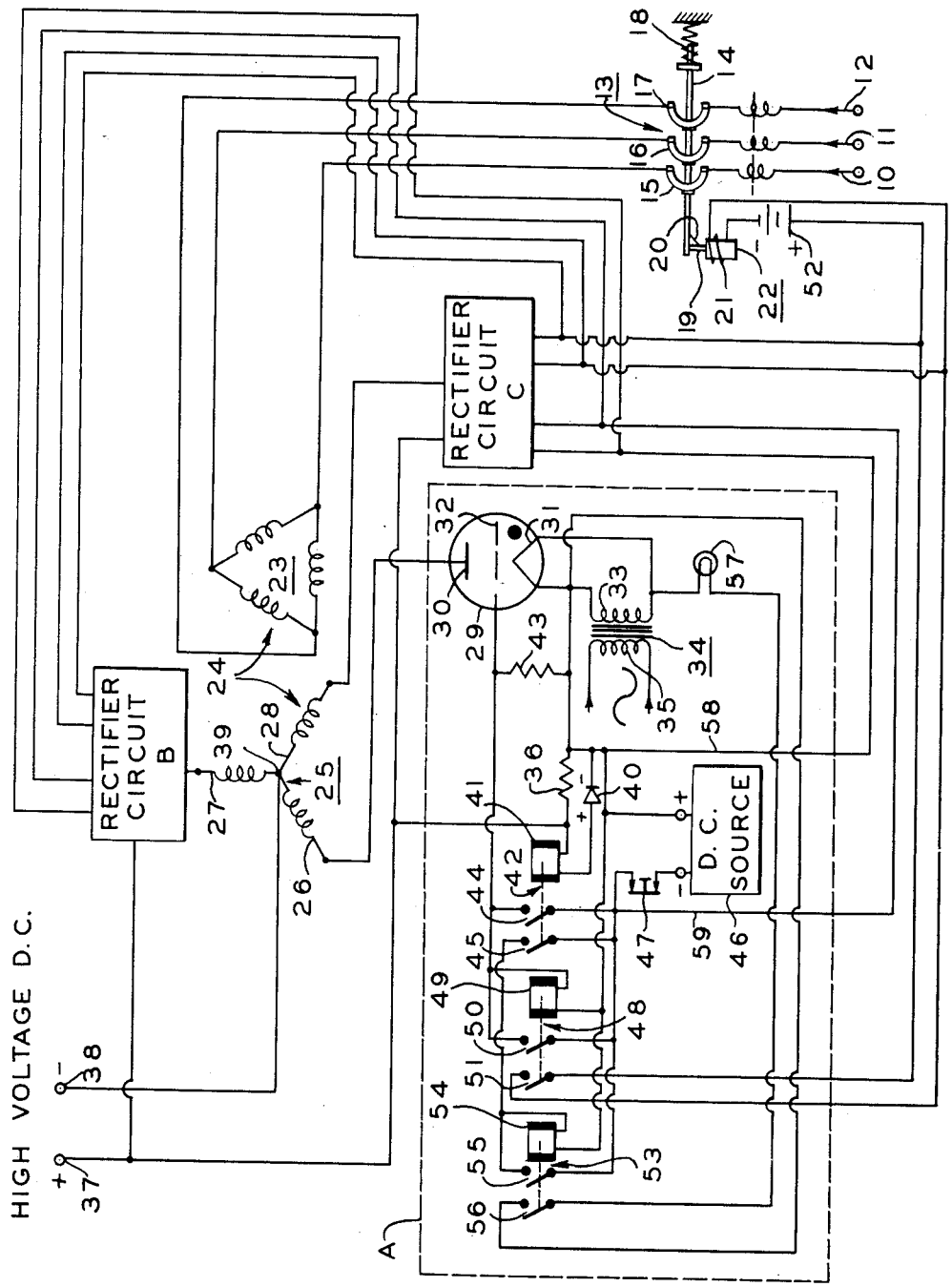
INVENTOR.
LESTER S. LAPPIN
BY
ATTORNEY

United States Patent Office 2,740,083
Patented Mar. 27, 1956

2,740,083
PROTECTIVE CIRCUIT

Lester S. Lappin, Merchantville, N. J., assignor to Radio Corporation of America, a corporation of Delaware Application August 27, 1954, Serial No. 452,693

2 Claims. (Cl. 321—13)

This invention relates to a protective circuit, and more particularly, to a circuit for protecting a gaseous discharge device against destructive inverse conduction therethrough. This invention is useful in the protection of gaseous rectifiers by preventing the flowing of abnormal destructive, inverse currents that occur during arc-back by interrupting the flow of such abnormal currents after a short period of time.

Well known gaseous rectifier tubes contain an anode and a cathode. The anode is connected to a source of alternating current which may be a power transformer secondary winding. The cathode may be connected to a direct current utilization device, circuit, or the like. At approximately the end of the positive half cycle of the A.-C. potential that is applied to the anode, normal conduction through the tube ceases. However, the gaseous atmosphere in the rectifier may be in a highly ionized, conductive state. The potential applied to the anode becomes negative in the next half cycle, and high inverse potentials are caused to exist across the gaseous discharge tube. This may lead to the initiation of a discharge in the tube causing conduction therethrough in an inverse direction. Such a discharge results in an effective short circuit of the alternating current supply. Therefore, excessively high currents may flow through the rectifier. This inverse discharge is known generally as "arc-back" or "back-fire." It is apparent that high current flow during arc-back may cause the destruction of the rectifier and associated apparatus.

Conventionally, overload circuit breakers are connected in series with the alternating current supply. For example, circuit breakers are provided in the power lines connected to the high-voltage power transformer. However, such devices are inherently slow acting and may require a second or longer to interrupt the circuit. Furthermore, arc-back is an intermittent phenomena. An isolated arc-back may occur after which normal operation takes place. In the majority of applications, the overload circuit breaker will permanently open the circuit on an isolated arc-back. A manual resetting operation is necessary in order to restore normal operation. Other means for temporarily disrupting the circuit by short circuiting the supply source to the rectifier on an arc-back manifestly require substantial installations of expensive, high-powered electron tubes.

Accordingly, it is an object of this invention to provide a novel arc-back protective circuit.

It is a further object of the present invention to provide an arc-back protective circuit that is extremely fast in operation.

It is a still further object of the present invention to provide an arc-back protective circuit that is simple to manufacture and is relatively inexpensive.

It is a still further object of the present invention to provide for automatic resetting in an arc-back protective circuit in the case of a single isolated arc-back, and to provide for maintaining circuit interruption in the case of repeated arc-backs.

These and other objects are accomplished according to one embodiment of the present invention for protecting a three element gaseous discharge device having an anode, a cathode, and a control electrode against destructive arc-backs. The anode of this device is connected to the alternating current supply source. A unidirectional conduction element such as a diode is connected to the cathode of the discharge device. The unidirectional conduction element is polarized to allow conduction therethrough of only inverse currents that occur during an arc-back. A fast operating relay is connected to be operated by current flow through the unidirectional conduction element. During an arc-back this relay is operated and the contacts associated therewith are closed. A source of negative potential is connected to the control electrode of the discharge device on closing of the relay. The magnitude of this negative potential is at least that of the cut-off potential of the gaseous discharge device. Therefore, the current during arc-back flows through the discharge device only during the remainder of the half cycle during which the anode potential is negative. The relay contacts remain closed for a predetermined interval after initial operation so that the control electrode blocks ionization in the discharge device and prevents further arc-backs during succeeding cycles.

A time delay relay which receives energizing current through a pair of contacts associated with the first-mentioned relay may be included in the protective circuit. When operated, this time delay relay continuously connects the source of negative potential to the control electrode. After a predetermined number of repetitive arc-backs, the time delay relay will be operated. In order to restore normal operation in the rectifier circuit, a reset switch must be operated manually to deenergize the time delay relay.

Other objects and advantages of the present invention will, of course, become apparent and immediately suggest themselves to those skilled in the art to which the invention is directed from a reading of the following specification in connection with the accompanying drawing, the single figure of which is a schematic diagram showing an illustrative embodiment of a protective circuit according to the present invention.

Referring to the drawing, the protective circuit will be described with reference to a three phase rectifier system. Three phase A.-C. voltages are connected to the rectifier system along three power lines 10, 11 and 12. A three phase overload circuit breaker 13 is inserted in the power lines. The circuit breaker 13 is shown in the closed position. A rod 14 is connected to the circuit interrupting contacts 15, 16 and 17 of the circuit breaker 13. A compression spring 18 is connected to one end of this rod 14. The spring 18 is held in compression by the rod 14 and is capable of exerting sufficient force to open the contacts 15, 16 and 17 of the circuit breaker 13. A stop 20 on the rod 14 is held by a plunger 19 of a solenoid 22. The plunger is withdrawn when the winding 21 of the solenoid 22 is energized. The energization of the solenoid 22 is accomplished by the protective circuits and will be described later.

The alternating current supply lines 10, 11 and 12 are connected to a delta connected primary 23 of a three phase step-up power transformer 24. A Y connected secondary 25 is provided on the power transformer 24. Each leg 26, 27, 28 of the transformer secondary is connected to a substantially identical rectifier circuit A, B, C respectively. The rectifier circuit A, connected to one of the secondary transformer legs 26, is shown enclosed by dotted lines. The other substantially identical rectifier circuits B and C which are connected to the remaining two legs of the transformer secondary 27 and 28 respectively, and are shown in block form for simplicity of illustration.

A gaseous discharge device which may be a thyratron tube 29 having an anode 30, a filamentary cathode 31, and a control electrode 32 is provided. The anode 30 is connected to one of the secondary windings 26 of the transformer secondary 25. The filamentary cathode 31 is connected across the secondary 33 of a filament transformer 34. The primary 35 of this transformer is connected to an alternating current supply source not shown to provide proper filament voltage for the filamentary cathode 31 of the thyratron 29. A resistor 36 is connected to one side of the filamentary cathode 31. The rectified direct current output of the thyratron 29 flows through this resistor 36 and is available at an output terminal 37. This terminal 37 is the positive, high voltage D.-C. output terminal. The end of the resistor 36 is connected to this terminal 37. A negative, high voltage D.-C. output terminal 38 is connected to the common junction point 39 of the secondary windings 26, 27 and 28 of the three phase transformer secondary 25. It may be observed that the rectifier circuits B and C are similarly connected to the positive output terminal 37.

A unidirectional conduction element which may be a diode 40 is also connected to the cathode 31 of the thyratron 29. An operating winding 41 of a relay 42 is connected in series with this diode 40. This operating winding 41 is connected to the resistor 36 at the positive, high voltage output terminal 37. It may be observed that the negative terminal of the diode 40 is connected directly to the cathode 31 of the thyratron 29. Therefore, normal currents produced by the thyratron 29 which flow through the ionized gaseous atmosphere from the anode 30 to the cathode 31 are not conducted by the diode 40 and, thereby do not energize the operating winding 41 of the relay 42.

A grid resistor 43 is connected between the control electrode 32 and the cathode 31 of the thyratron 29. The relay 42 is provided with two normally open pairs of contacts 44 and 45. The fixed contact of the contact pair 44 is connected to the control electrode 32 of the thyratron 29. The movable contact of this contact pair 44 is connected to a negative terminal of a D.-C. source 46. The potential supplied by the D.-C. source 46 has at least sufficient magnitude to block ionization in the thyratron 29 with regard to the voltages applied between the anode 30 and the cathode 31 thereof. This D.-C. source 46 has its positive terminal connected to the cathode 31 of the thyratron 29. A normally closed push-button switch 47 is connected between the movable contact of the contact pair 44 and the negative terminal of the D.-C. source 46. The D.-C. source 46 is shown illustratively in block form and it will be apparent that any available D.-C. source such as a battery or power supply having an output voltage of sufficient magnitude may be used as the D.-C. source 46. This D.-C. source 46 may be used in common by the other similar rectifier circuits B and C. Leads 59 and 58 connect the D.-C. source 46 to the other rectifier circuits B and C. It will also be apparent that operation of the relay 42 will close the contact pair 44 and thereby apply a negative potential to the control electrode 32 of the thyratron 29. A relay having a fast operation time in the order of a few milliseconds and a relatively slower release time may be used as this relay 42. It has been found that the C-P Clare type R or J is illustrative of a relay 42 that may be preferably used. This relay may be operated or pull-in in less than three milliseconds, and will release after the removal of operating potential in approximately one fourth of a second.

A time delay relay 48 having an operating winding 49 and two ganged contact pairs 50 and 51 is provided. This time delay relay 49 preferably has a time delay lasting the major portion of a second if sixty cycle voltage is being rectified. A preferable feature of this time delay relay 48 is that it may be operated by a predetermined number of separate voltage pulses. A time delay relay of a type that may be preferably used is the "Silic-O-Netic" time delay relay described in Bulletin No. 5,001A, issued December 1952 by the Heinemann Electric Company, Trenton, New Jersey. Such a relay which is adapted to have a time delay of three fourths of a second before pull-in or operation may be used in sixty cycle rectification. The operating winding 49 of the time delay relay 48 is connected between the positive terminal of the direct current source 46 and the control electrode 32 of the thyratron 29. It may then be observed that operation of the first-mentioned relay 41 supplies a pulse of energizing current to the operating winding 49 of the time delay relay 48. After the predetermined time delay, the time delay relay 48 will be operated, and the contacts 50 and 51 will close. The contacts 50 are connected between the negative terminal of the direct current source 46 and the control electrode 32 of the thyratron 29. Therefore, operation of the time delay relay 48 applies a negative bias to the control electrode 32. Also a complete circuit is made from the direct current source 46 to the operating winding 49 of the time delay relay 48 through the contacts 50. This causes continuous operation of the time delay relay 48. Correspondingly the negative bias is maintained on the control electrode 32.

The remaining pair of contacts 51 of the time delay relay 48 is connected to the winding 21 of the solenoid 22 through a battery 52. Therefore, energization of the time delay relay operates the solenoid 22. The plunger 19 is withdrawn. The contacts 15, 16 and 17 of the circuit breaker 13 open, thereby opening the primary circuit to the rectifying system. It may be observed that the other rectifier circuits B and C are also connected to the winding 21 of the solenoid 22. Operation of a similar time delay relay in the rectifier circuits B or C will also trip the circuit breaker.

The solenoid operated tripping mechanism and the circuit breaker 13 are merely desirable additional safeguards. In many applications such as low voltage rectifying systems such tripping mechanisms may be eliminated. To deenergize the time delay relay 48, it is necessary to depress the push-button switch 47.

An alarm relay 53 which has an operating winding 54 and two sets of gang contact pairs 55 and 56 is provided. The operating winding 54 of the alarm relay 53 is connected across the D.-C. source 46 through the pair of contacts 45 that are operated by the first-mentioned relay 42. The alarm relay 53 may be of the same type as the first-mentioned relay 42. Therefore, the alarm relay 53 will be operated upon operation of the first-mentioned relay 42. A pair of contacts 55 operated by the alarm relay 54 are connected across the D.-C. source through the operating winding 54 of the alarm relay 53. Therefore, operation of the alarm relay 53 will close this pair of contacts 55 so that the operating winding 54 of the relay may be continually operated and the contacts 55 and 56 will remain closed. The remaining contact pair 56 of the alarm relay 54 is connected across the secondary 33 of the filament transformer 34 through an alarm lamp 57. Accordingly a fault in the rectifier circuit will operate the alarm relay and the alarm lamp 57 will indicate that trouble has been experienced by the rectifier.

The protective circuit is dormant during normal operation of the rectifier. However, when an arc-back occurs the protective system is immediately operated. Assuming that an arc-back is initiated in the thyratron 29, an excessively large current will flow from the cathode 31 to the anode 30 through the ionized gaseous medium. Current flows in the reverse direction through the resistor 36 connected to the cathode 31. The cathode 31 becomes negative. Current may then flow through the diode 40 and also through the operating winding 41 of the relay 42 connected in series with it. Within a few milliseconds the relay 42 operates and the ganged contacts 44 and 45 are closed. A negative blocking potential is thereupon applied to the control electrode 32 of the thyratron 29. As the alternating current cycle progresses, the potential at the anode 30 becomes positive. Accordingly, conduction through the diode 40 ceases and the relay operating winding 41 is deenergized. However, the characteristics of the relay 42 are such that the contacts 44 and 45 remain closed for a predetermined time after the operating winding of the relay is deenergized. In sixty cycle alternating current rectification this time may be approximately one fourth of a second as previously mentioned. The blocking potential is maintained on the control electrode 32 for approximately one fourth of a second. Therefore, the control electrode controls the discharge and the possibility of a second arc-back during the immediately succeeding negative half cycles of the alternating current potential applied to the anode 30 will be prevented. Should the arc-back be an isolated one in which the fault in thyratron 29 that caused the arc-back is connected of its own accord, the relay 42 does not operate again.

The alarm relay 53, however, will be energized by the occurrence of the isolated arc-back in the thyratron 29. The contact 55 will be closed upon operation of the alarm relay 53 and will, thereby maintain it in an operative condition. The alarm lamp 57 consequently remains on and indicates that an arc-back has occurred. The continued operation of the rectifying system will indicate that the arc-back did not reoccur.

A series of recurrent arc-backs causes the relay 41 to alternately be operated and deenergized. The relay may remain operated for approximately one fourth of a second and be deenergized for a few milliseconds. After energization for a total time of approximately three fourths of a second the time delay relay 48 will be operated and the negative blocking potential will be continually applied to the control electrode 32 by the D.-C. source 46. In order to remove the blocking potential from the control electrode 33 the switch 47 must be depressed. This deenergizes the operating winding 49 of the time delay relay 48. Because of the excessively high anode potentials applied in some very high voltage D.-C. rectifying systems, a severe fault may cause a correspondingly severe arc-back during some portion of the negative one half cycle of the applied alternating current. The negative blocking potential applied to the control electrode 32 may not be sufficient to eliminate the arc-back during the entire negative one half cycle. Therefore, the more slowly acting mechanical switching system included in the circuit breaker 13 is incorporated in the protective device. Operation of the time delay relay will instantaneously apply the negative blocking position to the control electrode 32 of the thyratron 29 and also, cause the operation of the solenoid 22 which trips the circuit breaker 13.

The present invention has been described with reference to a three phase rectifying system using thyratron type gaseous rectifier tubes. It will be appreciated, of course, that other similar, known methods of suppressing the initiation of a gaseous discharge may be used in connection with the present invention.

What is claimed is:

1. A protective circuit for a gaseous rectifier having a cathode and an anode to protect said rectifier against destructive inverse conduction in the direction from said cathode to said anode during arc-back comprising means for applying alternating currents to be rectified to said anode, a diode connected to said cathode, said diode being polarized to pass only inverse currents flowing into said cathode, a relay connected to said diode, said relay having a pair of normally open contacts, means for blocking the initiation of a gaseous discharge between said cathode and said anode upon application of a blocking potential thereto, said blocking potential being applied to one of said contacts, said discharge blocking means being connected to said other contact, said relay connecting said blocking potential to said discharge blocking means on operation thereof, a time delay relay having a pair of normally open contacts, means providing energization of said time delay relay on operation of said first-named relay, said blocking potential being applied to one of said pair of time delay relay contacts, said discharge blocking means being connected to the other of said pair of time delay relay contacts, and means for maintaining continued operation of said time delay relay after initial operation thereof.

2. A protective circuit for a gaseous rectifier having a cathode, an anode and a control grid to protect said rectifier against destructive inverse conduction in the direction from said cathode to said anode during arc-back comprising means for applying alternating currents to be rectified to said anode, a diode connected to said cathode, said diode being polarized to pass only inverse currents flowing into said cathode, a relay connected to said diode, said relay having a pair of normally open contacts, means for applying a negative cut-off potential to one of said contacts, said control grid being connected to the other of said contacts, said relay connecting said cut-off potential to said control grid on operation thereof, a time delay relay having a pair of normally open contacts, means providing for energization of said time delay relay on operation of said first-named relay, means for applying said cut-off potential to one of said pair of time delay relay contacts, said control grid being connected to the other of said pair of time delay relay contacts, means to apply said cut-off potential to said control grid after a predetermined period of energization of said time delay relay, and means for maintaining continued operation of said time delay relay after initial operation thereof.

References Cited in the file of this patent

UNITED STATES PATENTS 2,342,791    Cox _____ Feb. 29, 1944